(12) United States Patent
Medgaus

(10) Patent No.: US 12,370,024 B2
(45) Date of Patent: Jul. 29, 2025

(54) DENTAL IMPLANT SYSTEMS, KITS CONTAINING DENTAL IMPLANT COMPONENTS, AND METHODS OF INSTALLING SAME

(71) Applicant: Stabili-Teeth LLC, Export, PA (US)

(72) Inventor: Carl Medgaus, Export, PA (US)

(73) Assignee: Stabili-Teeth LLC, Export, PA (US)

( * ) Notice: Subject to any disclaimer, the term of this patent is extended or adjusted under 35 U.S.C. 154(b) by 60 days.

(21) Appl. No.: 17/487,707

(22) Filed: Sep. 28, 2021

(65) Prior Publication Data

US 2022/0096210 A1    Mar. 31, 2022

Related U.S. Application Data

(60) Provisional application No. 63/084,924, filed on Sep. 29, 2020.

(51) Int. Cl.
A61C 8/00    (2006.01)

(52) U.S. Cl.
CPC .......... *A61C 8/0089* (2013.01); *A61C 8/0093* (2013.01); *A61C 2008/0084* (2013.01)

(58) Field of Classification Search
CPC . A61C 8/0095; A61C 13/2656; A61C 13/087; A61C 13/1016; A61C 2008/0084;
(Continued)

(56) References Cited

U.S. PATENT DOCUMENTS

| | | | |
|---|---|---|---|
| 5,556,280 A * | 9/1996 | Pelak ................... | A61C 8/0048 433/172 |
| 7,866,979 B2 | 1/2011 | Verban, Jr. | |

(Continued)

FOREIGN PATENT DOCUMENTS

| KR | 101566795 B1 * | 11/2015 | |
|---|---|---|---|
| KR | 20170089584 A | 8/2017 | |
| WO | WO-2015030166 A1 * | 3/2015 | ............. A61C 13/01 |

OTHER PUBLICATIONS https://www.youtube.com/watch?v=HE9hBDPZo4g (Year: 2019).*

(Continued)

*Primary Examiner* — Eric J Rosen
*Assistant Examiner* — Luis Ruiz Martin
(74) *Attorney, Agent, or Firm* — Dinsmore & Shohl LLP

(57) ABSTRACT

A method of installing a dental prosthesis that includes having a practitioner install at least one narrow implant and at least one standard implant into a subject's bone, where the narrow implant has a narrow implant abutment that is exposed after installation, and the standard implant has a standard implant abutment exposed after installation. The practitioner places a narrow implant housing over each narrow implant abutment, and places a standard implant housing over each standard implant abutment. The practitioner flows a resin within a channel located within a dental prosthesis and places the dental prosthesis over each narrow implant housing and each standard implant housing such that the resin surrounds each narrow implant housing and each standard implant housing. Once the resin cures, each narrow implant housing and each standard implant housing is fixed within the resin and the resin is fixed within the dental prosthesis.

14 Claims, 10 Drawing Sheets

(58) Field of Classification Search
CPC ... A61C 8/0089; A61C 8/0093; A61C 8/0048; A61C 8/0098; A61C 8/005; A61C 8/0053; A61C 8/0054; A61C 8/0057; A61C 8/0062; A61C 8/0065; A61C 8/0075; A61C 8/0001; A61C 5/82; A61C 5/85; A61C 5/90
USPC .......................................................... 433/37
See application file for complete search history.

(56) References Cited

U.S. PATENT DOCUMENTS

| | | |
|---|---|---|
| 9,131,993 B2 | 9/2015 | Bar |
| 9,554,879 B2 | 1/2017 | Harrison |
| 2008/0227057 A1 | 9/2008 | Anitua |
| 2009/0017421 A1* | 1/2009 | Letcher ................ A61C 8/0048 433/201.1 |
| 2012/0251974 A1 | 10/2012 | Katz |
| 2020/0188074 A1* | 6/2020 | Ryuma .................... A61C 5/82 |

OTHER PUBLICATIONS

Straumann Mini Implant System Step by Step (a manufacturer of dental implants and specialized in related technologies) [online]. [retrieved Jul. 19, 2024]. Retrieved from the Internet: https://www.youtube.com/watch?v=HE9hBDPZo4g (Year: 2019).*

* cited by examiner

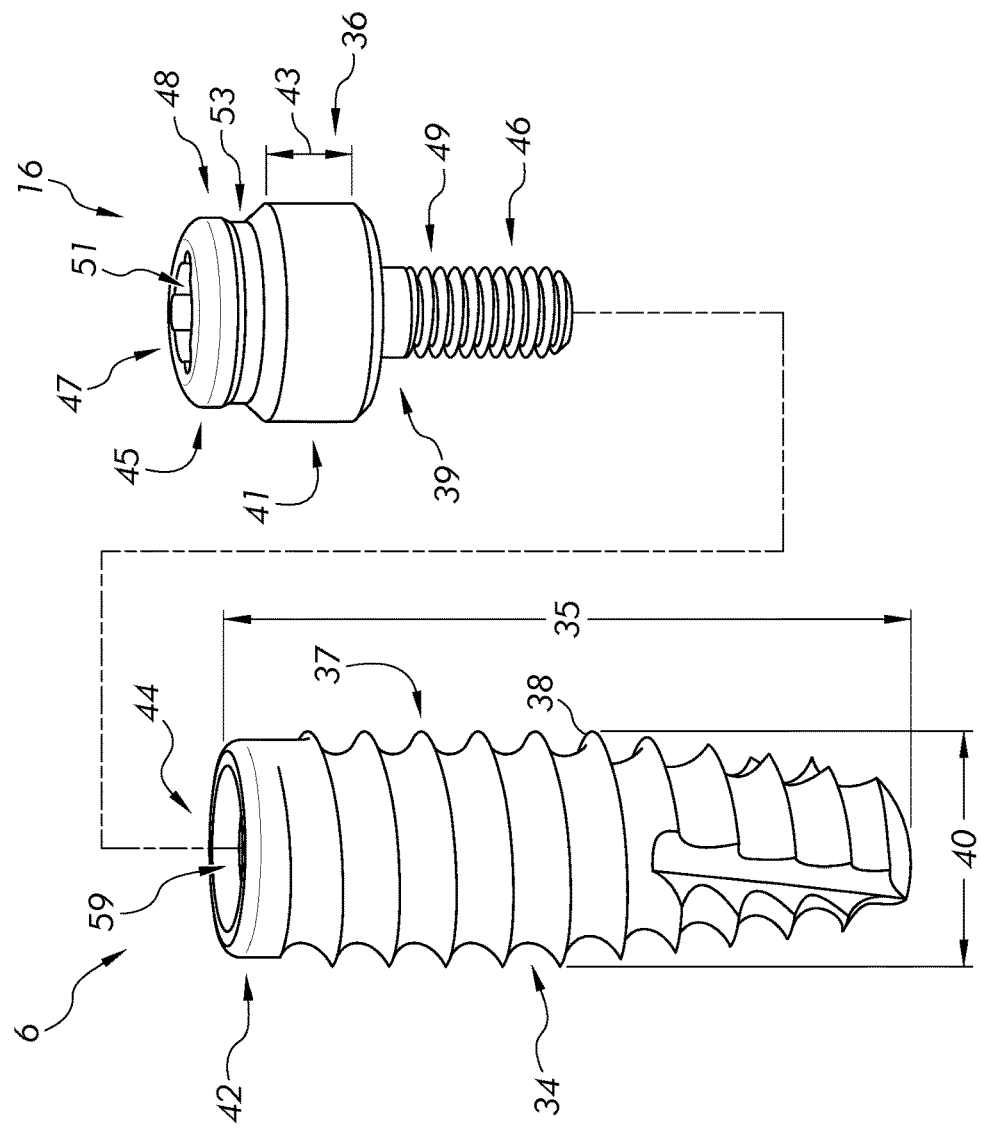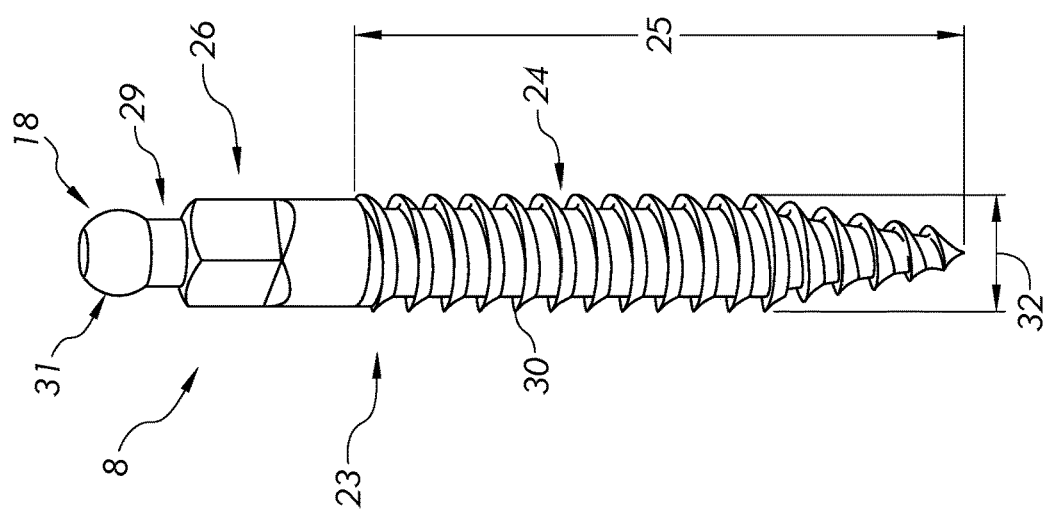

DENTAL IMPLANT SYSTEMS, KITS CONTAINING DENTAL IMPLANT COMPONENTS, AND METHODS OF INSTALLING SAME

CROSS-REFERENCE TO RELATED APPLICATION

The present application claims the priority benefit of U.S. Provisional Application Ser. No. 63/084,924, entitled "DENTAL IMPLANT SYSTEMS, KITS CONTAINING DENTAL IMPLANT COMPONENTS, AND METHODS OF INSTALLING DENTAL IMPLANTS" and filed on Sep. 29, 2020, the entire contents of which are hereby incorporated by reference.

BACKGROUND

Technical Field

The present specification generally relates to dental implants and, more specifically, installing dental implants.

Technical Background

When an individual loses all or a substantial portion of teeth in their maxillary or mandibular arches, the individual will often seek the assistance of a practitioner, who will generally recommend several different treatment options. Certain treatment options may be expensive, may require several follow up visits, may not be permanent, and/or may not be stable.

SUMMARY

One aspect of the present disclosure relates to a method of installing a dental prosthesis that includes the following steps: installing an at least one narrow implant by inserting a bottom portion of the narrow implant into a bone in a subject's mouth and leaving a top portion of the narrow implant exposed, where the top portion comprises a narrow implant abutment; installing an at least one standard implant by inserting a lower portion of the standard implant into a bone in a subject's mouth, leaving an upper portion of the standard implant exposed, where the upper portion of the standard implant comprises a standard implant abutment; placing a narrow implant housing over each narrow implant abutment; placing a standard implant housing over each standard implant abutment; flowing a resin within a channel of a dental prosthesis; placing the dental prosthesis over each narrow implant housing and each standard implant housing such that the resin surrounds each narrow implant housing and each standard implant housing; and curing the resin such that each narrow implant housing and each standard implant housing is fixed within the resin and the resin is fixed within the dental prosthesis.

Another aspect of the present disclosure relates to a method of installing a dental prosthesis that includes the following steps: installing an at least one narrow implant by inserting a bottom portion of the narrow implant into a bone in a subject's mouth and leaving a top portion of the narrow implant exposed, where the top portion comprises a narrow implant abutment; installing an at least one standard implant by inserting a lower portion of the standard implant into a bone in a subject's mouth, leaving an upper portion of the standard implant exposed, where the upper portion of the standard implant comprises a standard implant abutment; placing a dental dam over each at least one narrow implant and each at least one standard implant, the dental dam comprising at least one narrow opening and at least one standard opening, such that each narrow opening allows each narrow implant abutment to extend through the dental dam once the dental dam is placed over each narrow implant, and such that each standard opening allows each standard implant abutment to extend through the dental dam once the dental dam is placed over each standard implant abutment; placing a narrow implant housing insert within a narrow housing cavity located within an at least one narrow implant housing; placing each narrow implant housing over each narrow implant abutment, thereby putting each narrow housing insert into contact with each narrow implant abutment; placing a standard implant housing insert within a standard housing cavity located within an at least one standard implant housing; placing each standard implant housing over each standard implant abutment, thereby putting each standard implant housing insert into contact with each standard implant abutment; flowing a resin within a channel of a dental prosthesis; placing the dental prosthesis over each narrow implant housing and each standard implant housing such that the resin surrounds each narrow implant housing and each standard implant housing; curing the resin such that each narrow implant housing and each standard implant housing is fixed within the resin and the resin is fixed within the dental prosthesis; removing each narrow implant housing from each narrow implant abutment and each standard implant housing from each standard implant abutment, thereby removing the dental prosthesis; removing the dental dam; and placing each narrow implant housing over each narrow implant abutment and each standard implant housing over each standard implant abutment, thereby reinstalling the dental prosthesis Yet another aspect of the present disclosure relates to a kit for installing a dental prosthesis into a subject's mouth that the includes the following items: a plurality of standard implants comprising a lower portion and an upper portion; where the lower portion is designed to be inserted into a bone within the mouth of a subject, and where the upper portion comprises a standard implant abutment; a plurality of narrow implants comprising a bottom portion and a top portion, where the bottom portion is designed to be inserted into a bone within the mouth of a subject, and where the top portion comprises a narrow implant abutment: a plurality of standard implant housings designed to fit over the standard implant abutments, where the standard implant housings comprise a standard housing cavity; a plurality of narrow implant housings designed to fit over the narrow implant abutments, where the narrow implant housings comprise a narrow housing cavity; and a set of instructions outlining a method of installing a dental prosthesis.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIG. 3 depicts an illustrative narrow implant according to one or more embodiments shown and described herein;

FIG. 4 depicts an exploded perspective view of an illustrative standard implant according to one or more embodiments shown and described herein;

DETAILED DESCRIPTION

Figure 1:
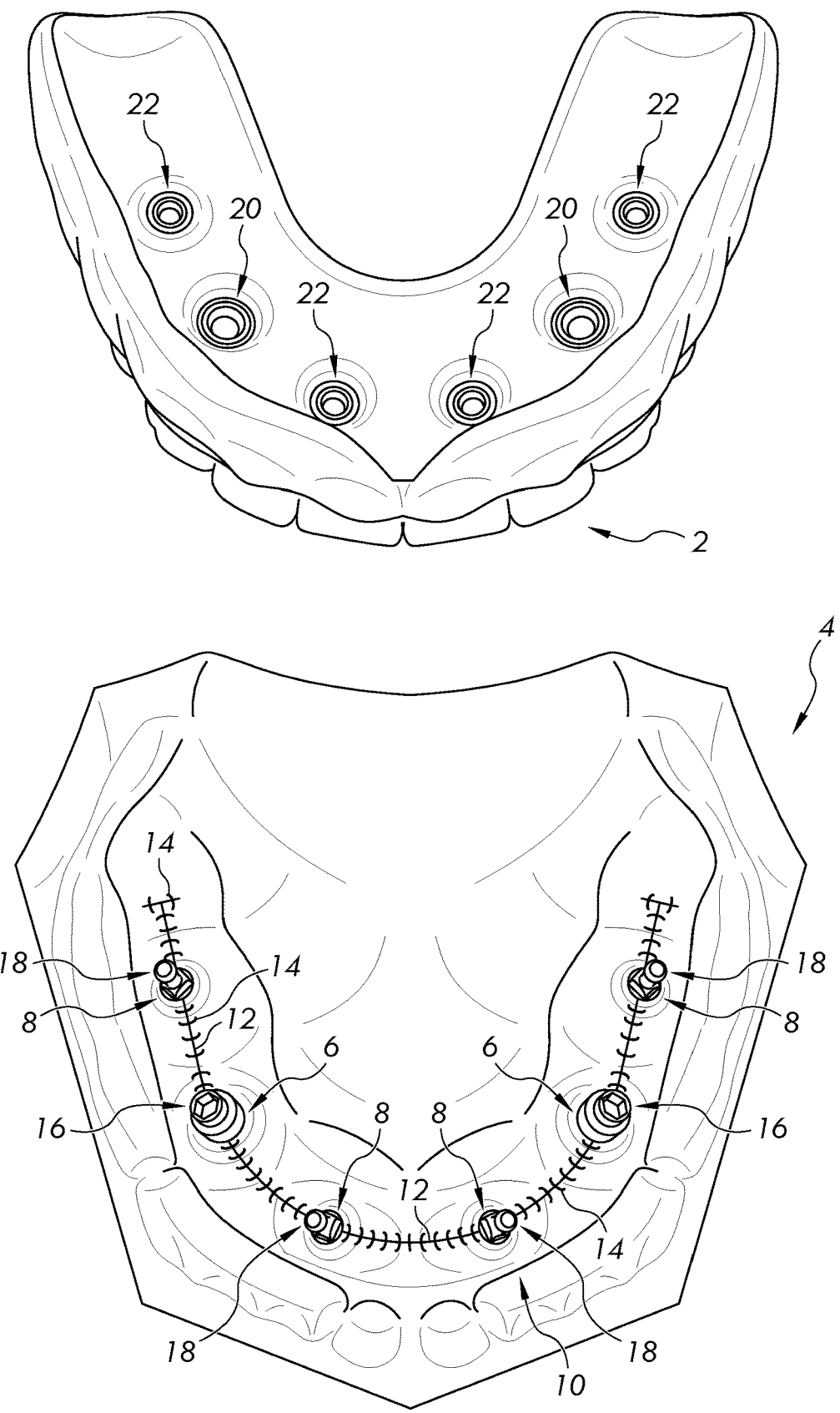
FIG. 1 depicts a perspective view of an illustrative dental prosthesis having housings that correspond in shape, size, and location to implants within a subject's maxilla according to one or more embodiments shown and described herein.

The present disclosure generally relates to methods of applying a dental prosthesis to the maxilla or mandible of a subject that involve the installation of a combination of standard implants and narrow implants into a subject's maxillary and/or mandibular bone. The present disclosure also generally relates to kits that contain the various standard implants, narrow implants, and other parts necessary to perform such methods, as well as instructions for completing the same.

Generally, when a practitioner recommends treatment options to an individual who has lost all or a substantial portion of teeth in their maxillary or mandibular arches, the practitioner may recommend traditional dentures or the installation of a full arch fixed detachable (FAFD) dental prosthesis.

Traditional dentures are designed to last between 5 and 10 years, and are placed and removed within an individual's mouth on a daily basis. However, many individuals do not opt for traditional dentures due to the multitude of problems inherent in their use. For example, many individuals find the regular maintenance associated with traditional dentures overly cumbersome. Also, traditional dentures have a tendency to slip or move in an individual's mouth, which can cause the individual discomfort and adversely affect the individual's ability to properly chew food, speak, and/or the like.

Another treatment option that a practitioner might recommend is the installation of a FAFD dental prosthesis. The installation of a FAFD dental prosthesis generally involves the installation of four to six standard sized dental implants into the alveolar ridge of an individual. These standard implants generally have a diameter of at least 3.0 mm. After the four standard implants are installed and the patient has healed, the FAFD dental prosthesis is attached to the standard implants via screws.

Individuals, if given the opportunity, will often opt for a FAFD dental prosthesis. A FAFD dental prosthesis is designed to be permanently installed and can last a lifetime if properly cared for. A FAFD dental prosthesis is also much more stable than traditional dentures and functions more like natural teeth.

However, not every individual is a good candidate for a FAFD dental prosthesis. Many individuals have an alveolar ridge that is too narrow to support the installation of four standard sized implants. If the individual lacks ridge width, it may still be possible for the practitioner to install the requisite number of standard implants, but only after performing bone graft procedures, thereby increasing the installation time and the pain and discomfort the individual must suffer through to obtain a functional prosthesis. Additionally, the costs associated with installing a FAFD dental prosthesis are considerably higher than the cost associated with obtaining traditional dentures, and many individuals have no choice but to opt for traditional dentures for purely financial reasons.

Accordingly, many individuals would prefer a lower cost treatment option, as well as treatment options that can be used in individuals who lack the bone structure necessary to support a FAFD dental prosthesis, but who also want a more permanent and stable solution than traditional dentures. The systems, methods, and kits described in the present disclosure provide such a treatment option that may be desirable to such individuals.

FIG. 1 is a perspective view of an illustrative dental prosthesis 2 used according to one or more aspects of the present disclosure and a maxilla 4 of a subject having a plurality of standard implants 6 and plurality of narrow implants 8 installed within an installation site 10. While FIG. 1 depicts a plurality of standard implants 6 and a plurality of narrow implants 8, the present disclosure is not limited to such. That is, in some embodiments, a single narrow implant 8 and a single standard implant 6 may be used, a single standard implant 6 and a plurality of narrow implants 8 may be used, a single narrow implant 8 and a plurality of standard implants 6 may be used, or the like without departing from the scope of the present disclosure.

The plurality of standard implants 6 and plurality of narrow implants 8 are endosteal implants, which are surgically installed into the bone of the maxilla 4. While FIG. 1 depicts standard implants 6 and narrow implants 8 installed in the maxilla 4 of a subject, the present disclosure also includes installing standard implants 6 and narrow implants 8 in the mandible of a subject.

The maxilla 4 of FIG. 1 is shown after installation has taken place and the practitioner has closed a flap 12 using sutures 14. As described further below, the practitioner creates the flap 12 by making an incision at the installation site 10, separating the individual's tissue from the bone at the installation site 10, preparing the bone within installation site 10 to receive the standard implants 6 and narrow implants 8, installing the standard implants 6 and narrow implants 8, and suturing closed the flap 12.

Each standard implant 6 shown in FIGS. 1, 2, 4, 6, 9, and 11 is coupleable to a standard implant abutment 16. Each narrow implant 8 shown in FIGS. 1, 2, 3, 6, 9, and 11 includes a narrow implant abutment 18. In the present disclosure, the abutment of a dental implant (such as standard implant 6 or narrow implant 8) is located on the portion of the dental implant that is exposed after the dental implant has been installed into the maxillary or mandibular bone of the subject. Such abutments have a shape that is designed to be received by a housing (such as the standard implant housing 20 or narrow implant housing 22 shown in FIGS. 1, 5A, 5B, 7, 9, and 11), such that the housing may be secured to the abutment (e.g., snapped into place over the abutment), causing the abutment and housing to interlock.

One illustrative example of a standard implant abutment is a flanged abutment, as further described with respect to FIG. 4. One illustrative example of a narrow implant abutment is a ball abutment, as further described with respect to FIG. 3. While ball abutments and OD Secure abutments are depicted in FIG. 1, it should be readily appreciated that the systems, methods, and kits disclosed herein may use standard implants 6 or narrow implants 8 that include a variety of abutment types. Allowing the practitioner to select the abutment type associated with a standard implant 6 and a narrow implant 8 gives the practitioner greater flexibility because the practitioner may select the appropriate abutment type based on a variety of considerations, including, without limitation practitioner preference, or how the standard implant 6 or narrow implant 8 will be perform in the installation site 10. For instance, a ball abutment may extend a distance away from the installation site 10 that is generally further than a flanged abutment would, making selection of a flanged abutment more advantageous if there is a lack of space in the subject's mouth to install the prosthesis.

The dental prosthesis 2 in FIG. 1 includes a plurality of standard implant housings 20 and plurality of narrow implant housings 22. Each standard implant housing 20 and narrow implant housing 22 is positioned within the dental prosthesis 2 such that they may be seated on each respective standard implant abutment 16 and each narrow implant abutment 18 during installation as further detailed below.

Figure 2:
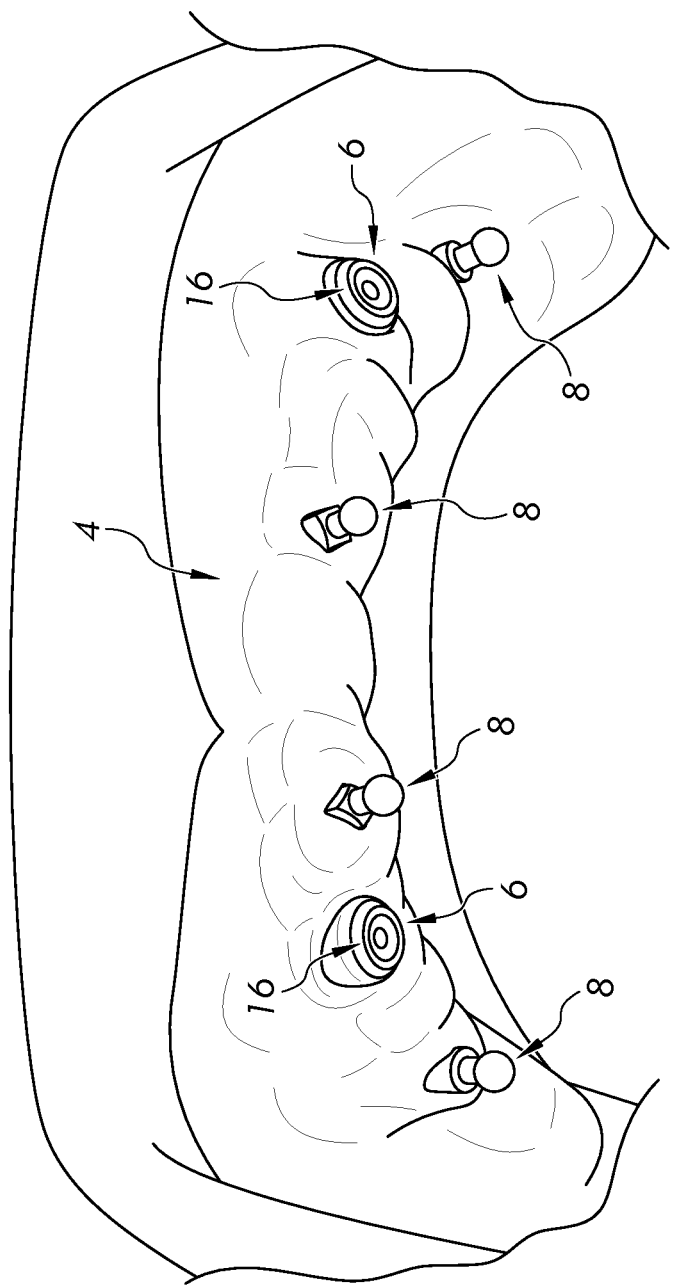
FIG. 2 depicts a perspective view of a subject's maxilla after narrow implants and standard implants have been installed and a flap has healed according to one or more embodiments shown and described herein.

FIG. 2 depicts a perspective view of a plurality of standard implants 6 and plurality of narrow implants 8 installed in a different subject's maxilla 4 after the flap has healed. As depicted in FIG. 2, the specific type of standard implant abutment 16 associated with standard implant 6 is a flanged abutment, and the specific type of narrow implant abutment 18 associated with narrow implant 8 is a ball abutment. While the plurality of standard implants 6 and plurality of narrow implants 8 in FIG. 1 have been installed in a relatively symmetrical fashion with respect to the midline of the arch, the subject in FIG. 2 has a maxilla 4 with a different bone structure, causing the practitioner to install the plurality of standard implants 6 and plurality of narrow implants 8 in an asymmetrical fashion with respect to the midline of the arch.

FIG. 3 is a perspective view of an illustrative narrow implant 8 that may be used in the methods disclosed herein and/or included in the kits disclosed herein. The narrow implant 8 depicted in FIG. 3 is a one-piece implant that includes a narrow implant body 23 having a lower portion 24 and an upper portion 26 spaced a distance apart from the lower portion 24. While the narrow implant 8 in FIG. 3 is a one piece implant, the present disclosure contemplates that the narrow implant may include two or more components, such as for example, a two component narrow implant having the lower portion 24 that is couplable to the upper portion 26. The upper portion 26 includes a narrow implant abutment 18. The narrow implant abutment is a ball abutment that includes a ball abutment cylinder 29. The ball abutment also includes a generally spherically shaped ball abutment end 31 that is adjoined to the ball abutment cylinder 29, where the ball abutment end 31 has a larger diameter than the ball abutment cylinder 29. However, it should be appreciated that this is merely one illustrative example, and other shapes and sizes of abutments may be used without departing from the scope of the present disclosure.

Figure 6:
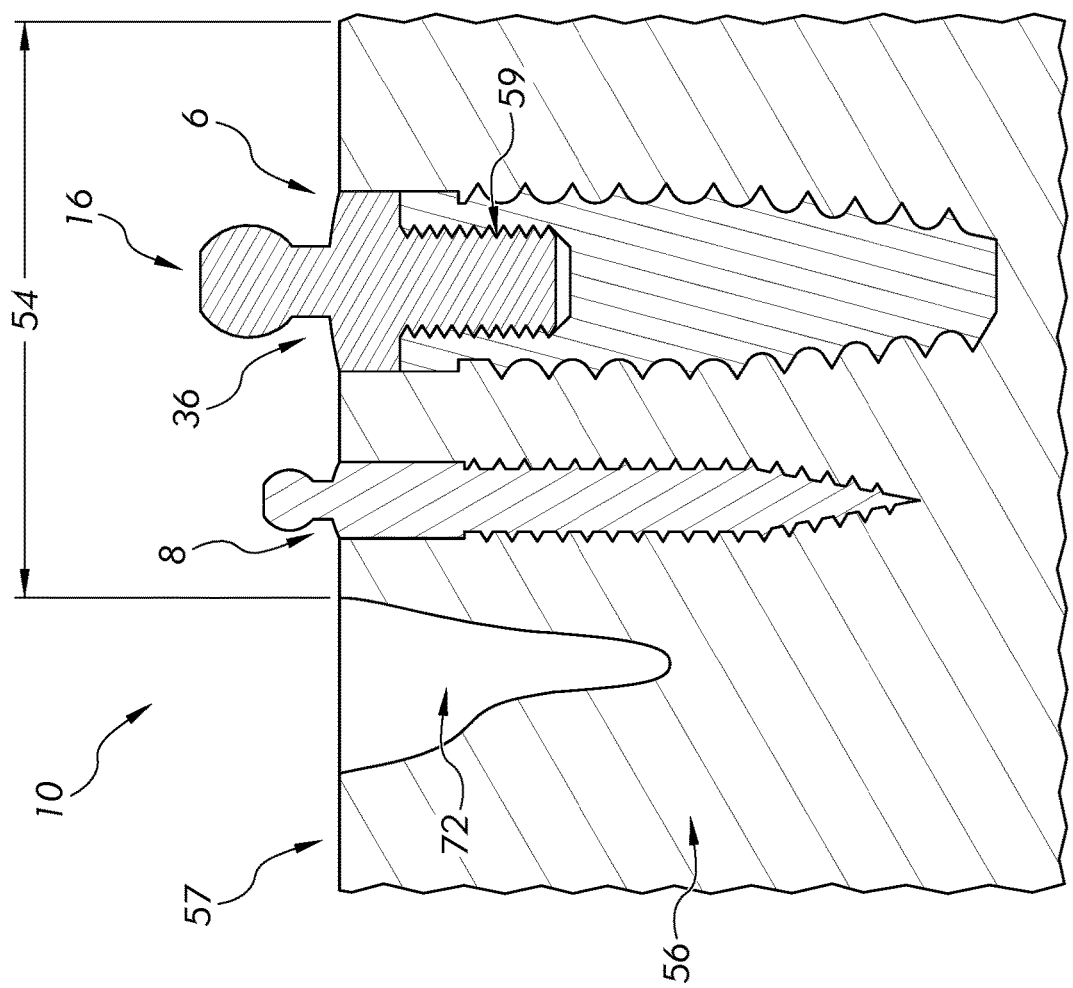
FIG. 6 schematically depicts a cross sectional view of a subject's mouth during installation of various dental implants according to one or more embodiments shown and described herein.

In some embodiments, the lower portion 24 may have a narrow implant length 25 between about 9 mm and about 18 mm, including but not limited to about 9 mm, about 10.5 mm, about 12 mm, about 15 mm, about 18 mm, or any value or range between any two of these values (including endpoints). The lower portion 24 may include a threaded outer surface 30 that engages with bone when installed. That is, during installation, the narrow implant 8 is screwed into a subject's bone 56 (as shown in FIG. 6) such that the threaded outer surface 30 of the narrow implant body 23 engages with the bone and the bone retains the narrow implant 8 therein. The narrow implant body 23 of the narrow implant may have a diameter 32 of about 2.9 mm or less, including (but not limited to) about 32.9 mm, about 2.75 mm, about 2.5 mm, about 2.25 mm, about 2.0 mm, about 1.75 mm, about 1.5 mm, about 1.25 mm, about 1 mm, less than 1 mm, or any value or range between any two of these values (including endpoints). In some embodiments, the diameter 32 may be the diameter of the narrow implant body 23 only, where in other embodiments, the diameter 32 may be the diameter of the narrow implant body 23 with the threaded outer surface 30.

The relatively narrower narrow implant diameter 32 of the narrow implant 8 allows the narrow implant 8 to be installed in certain areas of a subject's maxilla or mandible that may not be suitable for installation of a standard implant 6 (shown in FIG. 4). For instance, a subject may lack ridge width at certain locations within the installation site, making it impossible to install a standard implant within such locations without the practitioner performing a bone graft, causing the subject additional pain and inconvenience. However, the narrow ridge may still be suitable for installing a narrow implant 8.

Historically, there have been concerns about the use of narrow implants. Traditionally, the concern has been that narrow implants become unstable more quickly than standard implants, leading to a higher occurrence of implant failure. For more information related to the concerns associated with narrow implants, see "Comparing Implants and Stimulating Their Use," published by Clinicians Report in August 2014 and available at https://www.cliniciansreport.org/uploads/files/441/Implant-Survey.pdf, the contents of which are incorporated by reference herein. In the systems, methods, and kits disclosed herein, the use and inclusion of at least one standard implant 6 in combination with at least one narrow implant 8 (as shown, for example, in FIGS. 6 and 9) helps alleviate this concern because the narrow implant 8 supports the standard implant 6 and the standard implant 6 support the narrow implant 8, spreading the load out over multiple implants. This load sharing increases the initial stability of the dental prosthesis 2 on the day of surgery, as well as long-term predictability and longevity and therefore, success.

FIG. 4 depicts an exploded perspective view of an illustrative standard implant 6. The standard implant 6 includes two separate components: a lower component 34 with a lower component body 37 and an upper component 36 with an upper component body 39, though it is contemplated that a one piece standard implant may be used in the method and/or included in the kit disclosed herein. The lower component body 37 includes a lower component outer surface 38 that is threaded and has a lower component length 35. The lower component length 35 may be between about 5 mm and about 18 mm, including but not limited to about 5 mm, about 7 mm, about 9 mm, about 10.5 mm, about 12 mm, about 15 mm, about 18 mm, or any value or range between any two of these values (including endpoints). The lower component body 37 has a standard implant diameter 40 that is larger than the narrow implant diameter 32. The standard implant diameter 40 may be between about 3.0 mm or and about 8 mm, including without limitation about 3.25 mm, about 3.5 mm, about 4 mm, about 4.5, mm, about 5 mm, about 5.5 mm, about 7 mm, about 8 mm or any value or range between any two of these values (including endpoints). In some embodiments, the standard implant diameter 40 may be the diameter of the lower component body 37 only, where in other embodiments, the standard implant diameter 40 may be the diameter of the lower component body 37 with the threaded outer surface 38.

During installation, the lower component 34 is screwed into a subject's bone 56 (as shown in FIG. 6) such that the threaded lower component outer surface 38 of the lower component body 37 engages with the bone 56 and the bone 56 retains the standard implant 6 therein.

An upper end 42 of the lower component body 37 includes an opening 44 into an interior cavity 59 that is defined by one or more walls of the body of the standard implant (shown in FIG. 6). Still referring to FIG. 4, the interior cavity 59 may extend a distance within the lower component body 37. In some embodiments, the interior cavity 59 may have a threaded interior wall.

The upper component body 39 contains an upper portion 48 and a lower portion 49 spaced a distance apart from the upper portion 48, where the lower portion 49 includes an outer wall 46. In some embodiments, the outer wall 46 is threaded such that it may be threadably engaged with the threaded interior wall of an interior cavity 59, thereby causing the upper component 36 to interlock with the lower component 34.

The upper portion 48 of the upper component body 39 includes standard implant abutment 16. The upper component body 39 may optionally include a collar 41 between the top of lower portion 49 and the standard implant abutment 16. The collar 41 may have a collar height 43 between less than about 0.1 mm and about 6 mm, including, without limit, about 0.5 mm, about 1 mm, about 2 mm, about 3 mm, about 4 mm, about 5 mm or about 6 mm, or any value or range between any two of these values (including endpoints).

The standard implant abutment 16 in FIG. 4 is a flanged abutment. The flanged abutment shown has an exterior wall 45 and a top surface 47. The top surface 47 of the flanged abutment includes a socket 51 and the exterior wall 45 contains a depression 53 that extends circumferentially along the exterior wall 45. Examples of flanged abutments include, but are not limited to, the Locator® abutment manufactured by Zest Dental Solutions (Carlsbad, CA) or the OD Secure™ abutment manufactured by BioHorizons, Inc. (Birmingham, AL). While standard implant abutment 16 is a flanged abutment, the abutment may be one of any abutment designs common in the art, including without limitation a ball abutment. Once the lower component 34 of standard implant 6 is installed in a subject's bone 56, the practitioner causes the upper component 36 to become interlocked with the lower component 34.

Figure 5B:
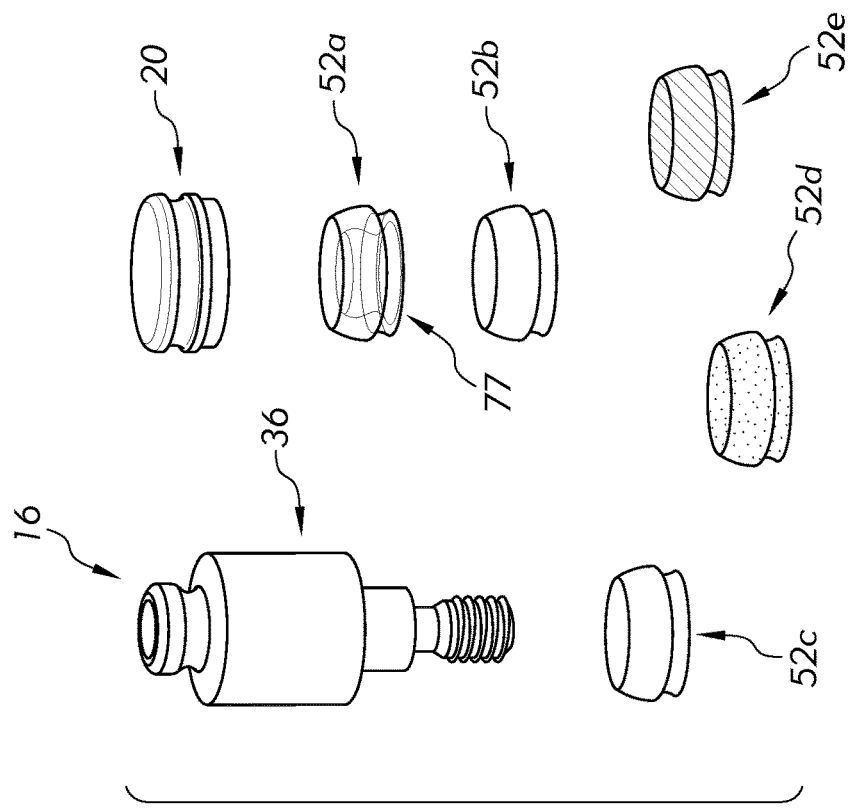
FIG. 5B depicts a perspective view of an upper portion of an illustrative standard implant, a standard implant housing, and standard implant inserts.
Figure 5A:
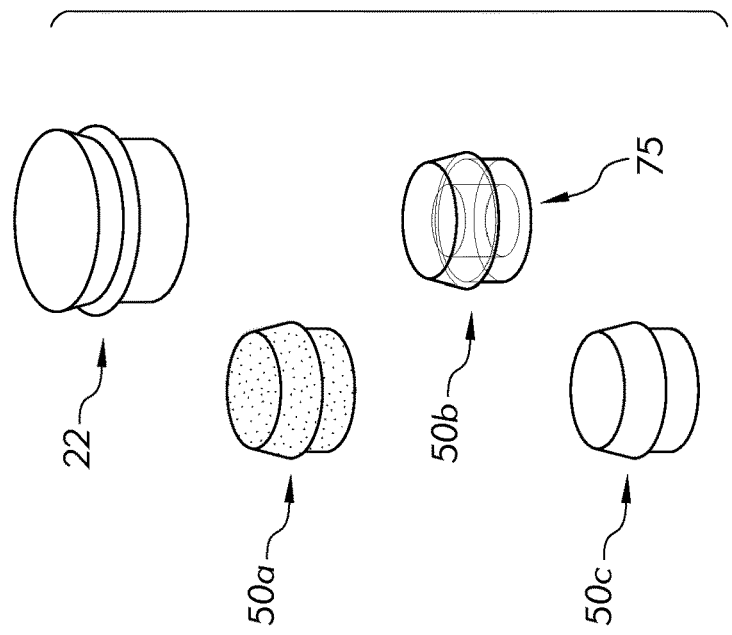
FIG. 5A depicts a perspective view of an illustrative narrow implant housing and illustrative narrow implant housing inserts according to one or more embodiments shown and described herein.
Figure 9:
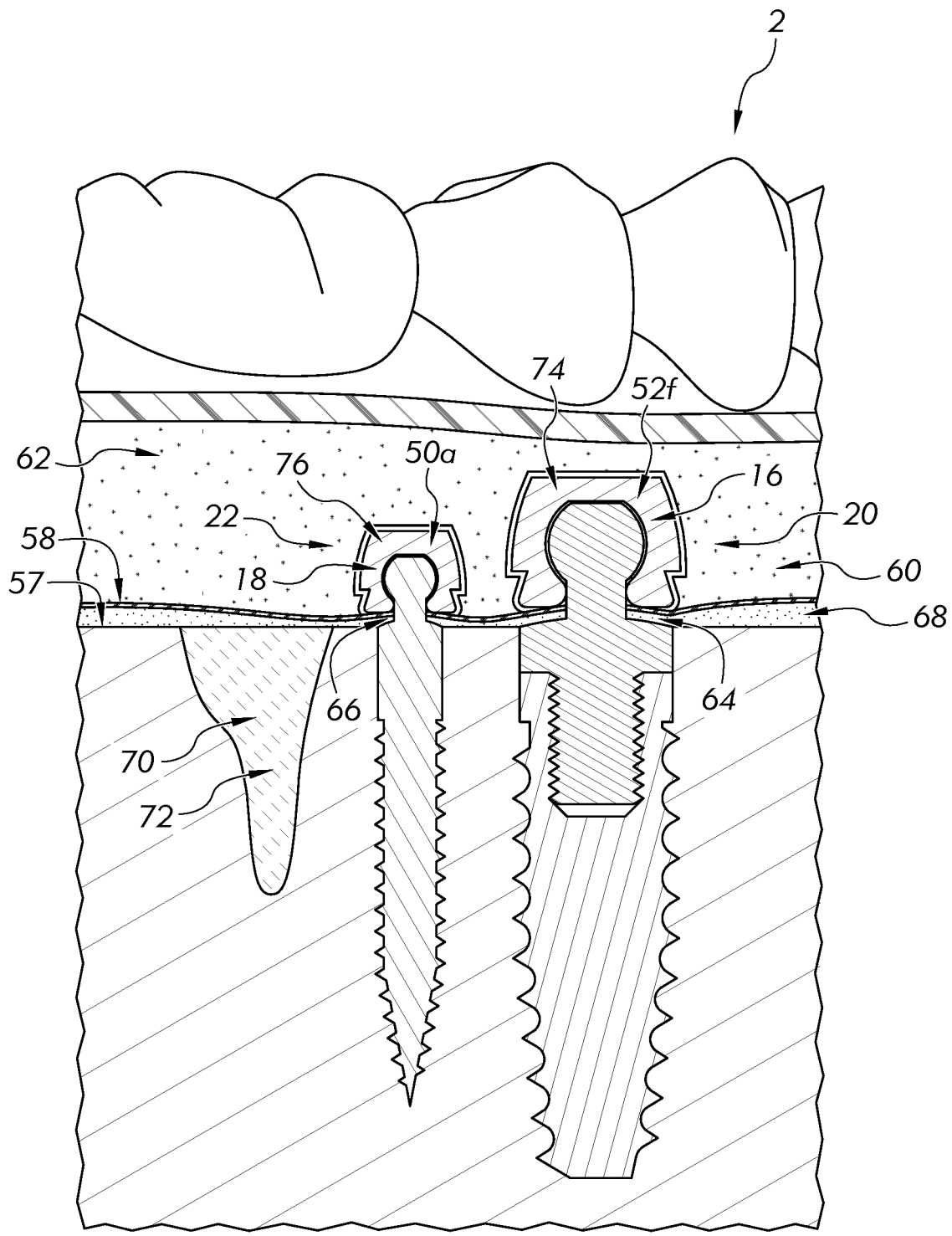
FIG. 9 schematically depicts a cross sectional view of a subject's mouth during installation of a dental prosthesis according to one or more embodiments shown and described herein.

FIG. 5A depicts an illustrative narrow implant housing 22 and a plurality of illustrative narrow implant housing inserts 50*a, b,* and *c*. Narrow implant housing inserts 50*a, b,* and *c* may be made of any material commonly used in the art, including, without limitation, nylon or silicone, and have a narrow insert interior 75. The narrow implant housing 22 contains a narrow housing cavity 76 (as shown in FIG. 9), which is specifically designed to engage the narrow housing inserts 50*a, b,* or *c*. One of these narrow implant housing inserts (e.g., 50*a*) may be placed within the narrow housing cavity 76 (as shown in FIG. 9) of narrow implant housing 22 prior to seating the narrow implant housing 22 over a narrow implant abutment 18, allowing the narrow implant housing 22 to have a tighter and more secure fit over the narrow implant abutment 18. In other words, narrow implant housings that do not contain narrow implant housing inserts have more room within the narrow housing cavity 76 than narrow implant housings that do contain narrow implant housing inserts. The less room within the narrow implant housing, the tighter the fit will be when the narrow implant housing is seated over a narrow implant abutment. Another added benefit of using a narrow implant using insert (e.g., 50*a*), is that they may be replaced with a new narrow implant housing insert in the event the original narrow housing insert becomes worn down, thereby ensuring that the fit between the narrow implant housing 22 and narrow implant abutment 18 remains tight and secure.

FIG. 5B shows the upper component 36 of a standard implant 6, including standard implant abutment 16, which is a flanged abutment. FIG. 5B also shows a standard implant housing 20 and various narrow standard housing inserts 52*a, b, c, d,* or *e*. Similar to narrow implant housings 50*a, b,* or *c*, standard implant housings 52*a, b, c, d,* or *e* may be made of any material commonly used in the art, including without limitation silicone or nylon, and have a standard insert interior 77. One of these standard implant housing inserts (e.g., 52*a*) may be placed within a standard housing cavity 74 (as shown in FIG. 9) of a standard implant housing 20 prior to seating the standard implant housing 20 over a standard implant abutment 16, allowing the standard implant housing 20 to have a tighter and more secure fit over the standard implant abutment 16. In addition, similar to the narrow implant housing inserts, an original standard implant housing inserts may be replaced with a new standard implant housing insert in the event the original standard housing insert becomes worn down, thereby ensuring that the fit between the standard implant housing 20 and standard implant abutment 16 remains tight and secure.

The particular inserts and housings associated with a narrow implant 8 or standard implant 6 may vary in design and construction depending on the abutment type that is selected for the narrow implant 8 or standard implant 6. For instance, if a narrow implant with a ball abutment is selected by a practitioner to ensure that the fit between the narrow implant abutment and narrow implant housing is tight, the practitioner may select a narrow implant insert (e.g 50*b*) with a narrow insert interior 75 that is specifically designed to receive the ball abutment. Likewise, if the narrow implant abutment selected by the practitioner includes a narrow implant abutment that is an OD Secure abutment, the practitioner may select a narrow implant insert (e.g, 50*b*) with a narrow insert interior 75 that is specifically designed to receive the OD Secure abutment. In some instances, the appropriate standard implant insert 77 or narrow implant insert 75 may include an o-ring (not depicted).

FIG. 6 shows a cross sectional view of a subject's mouth with a narrow implant 8 and a standard implant 6 installed into bone 56 in an edentulous area 54 in an installation site 10. In the context of the procedure, and as further discussed below in connection with the method or process outlined in FIG. 10, each implant would be installed into the bone 56 after the practitioner created the flap 12 (not shown), extracted any teeth from the installation site 10, and reduced the bone at the installation site 10 to create the necessary inter-occlusal space and an appropriate platform 57 for implant installation. The upper component 36 of the standard implant 6 includes the standard implant abutment 16, which in this case is a ball abutment. The upper component 36 has been screwed into the interior cavity 59 of the lower component 34 as described herein.

While FIG. 6 shows a narrow implant 8 and a standard implant 6 installed in an edentulous area 54, it should be readily understood that a narrow implant 8 or a standard implant 6 may be installed within a tooth socket 72 after tooth extraction, provided that there is enough bone surrounding the empty tooth socket 72 to support and secure the narrow implant or a standard implant 6 during and after installation. When a narrow implant 8 or a standard implant 6 is installed within a tooth socket 72, the practitioner may optionally insert bone graft material within the tooth socket 72 after the implant is installed but prior to the closing the flap 12. Adding the bone graft material may assist osseointegration of the implant in some embodiments.

Figure 7:
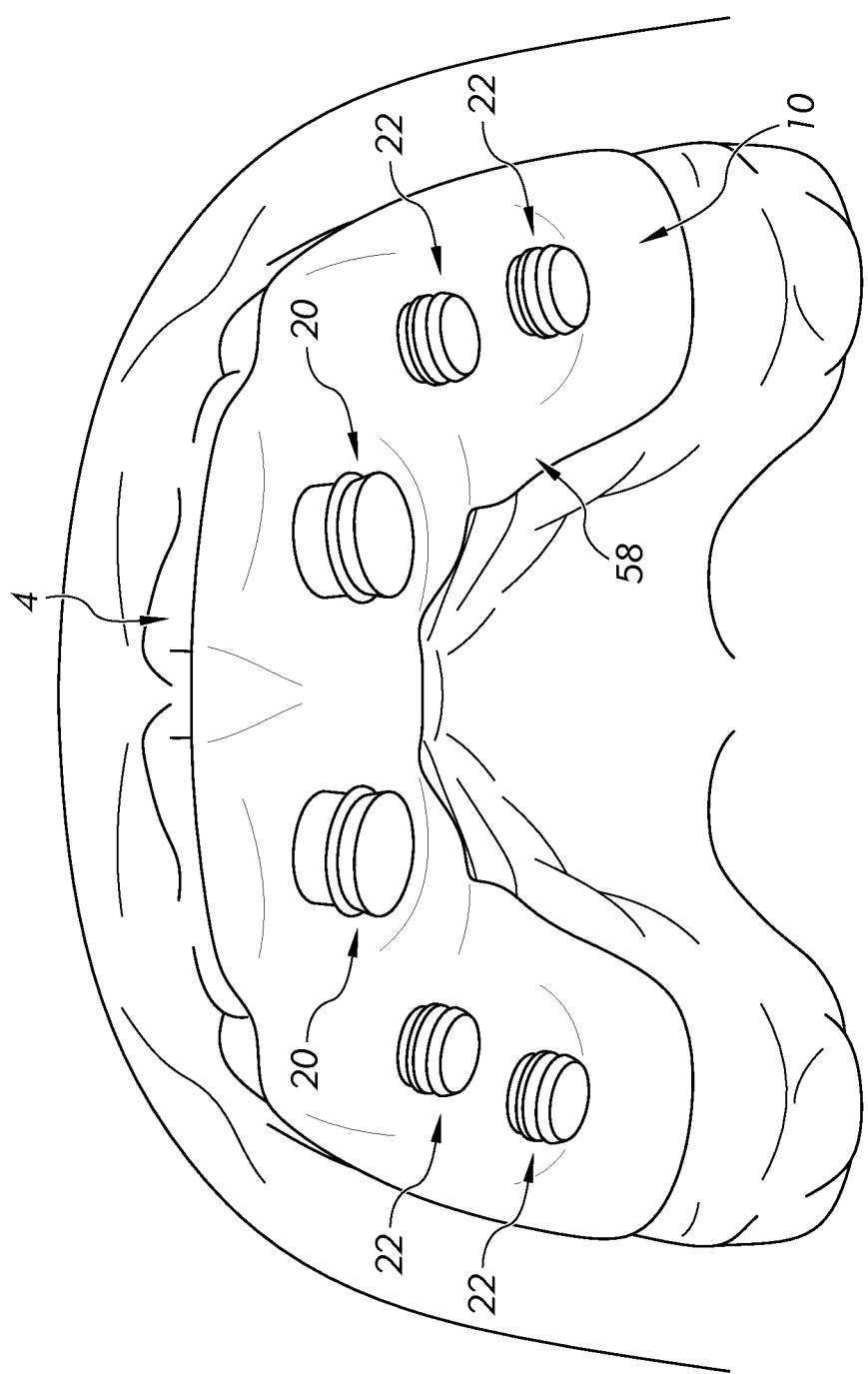
FIG. 7 depicts a perspective view of a subject's mouth after a plurality of narrow implants and standard implants have been installed before the dental prosthesis is seated at an installation site according to one or more embodiments shown and described herein.

FIG. 7 is a perspective view of a dental dam 58 placed over an installation site 10, with standard implant housings 20 and narrow implant housings 22 being placed over narrow implant abutments and standard implant abutments that extend through the dental dam 58. This step in one embodiment of the method would take place during the procedure after the step shown in FIG. 1, where a plurality of standard implants 6 and a plurality of narrow implants 8 have been installed in an installation site 10 and a flap 12 has been closed (e.g., via sutures) such that the abutments extend through the surface of the closed flap 12. Returning to FIG. 7, the dental dam 58 has been placed over the abutments to protect the sutured area from damage and to prevent bacteria from entering into the closed flap while the standard implant housings 20 and narrow implant housings 22 are placed over the respective abutments, and while the standard implant housings 20 and narrow implant housings 22 are fixed to the dental prosthesis as shown in FIGS. 8 and 9 and as further described below.

Figure 8:
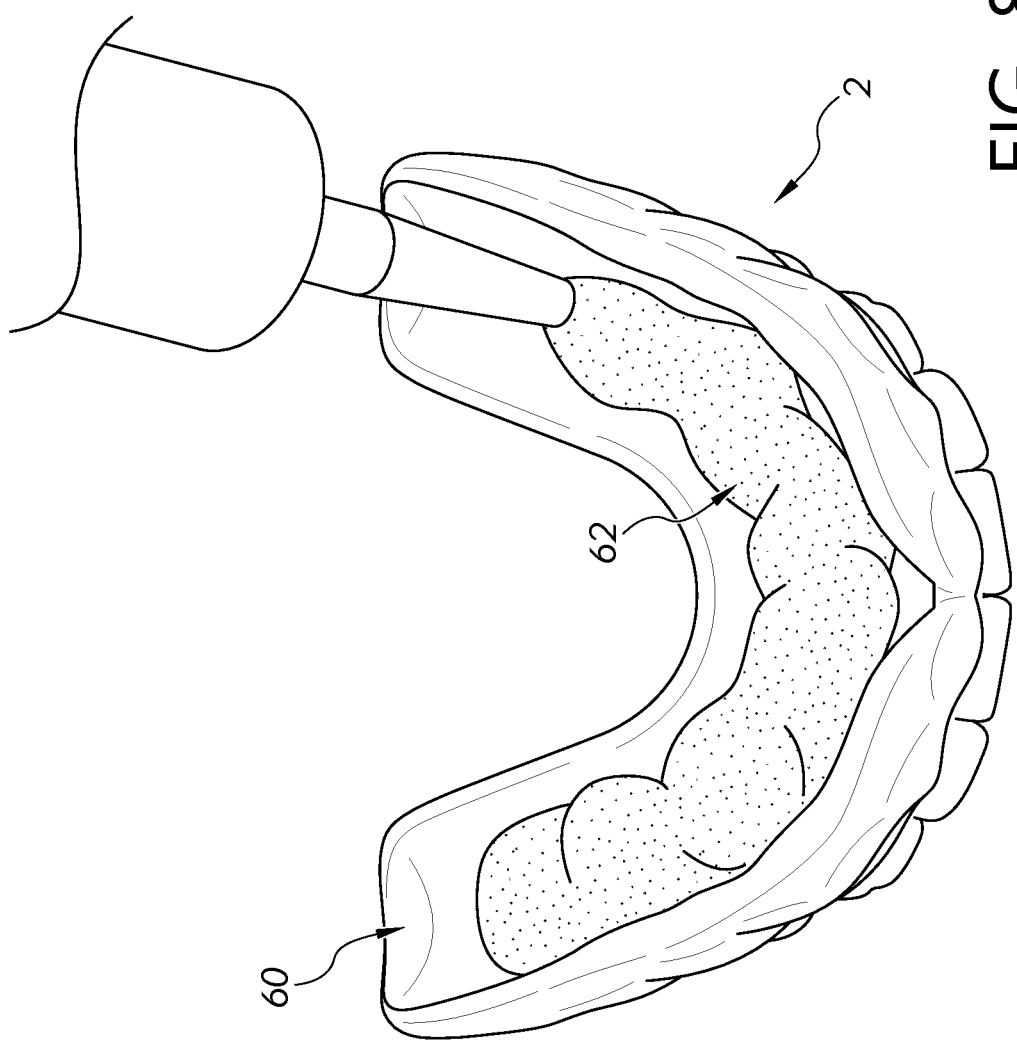
FIG. 8 schematically depicts an illustrative application of resin within a channel of a dental prosthesis according to one or more embodiments shown and described herein.

FIG. 8 shows a channel 60 located in a dental prosthesis 2 opposite to the occlusal side of the dental prosthesis 2. After the dental dam 58 is placed over the abutments and the standard implant housings 20 and narrow implant housings 22 are placed over the respective abutments, the practitioner will fill the channel with resin 62. The resin 62 may be made of any material commonly used in the art, including without limitation auto-polymerized acrylic resin. Once the resin 62 is placed within the channel 60, the dental prosthesis 2 is placed over an installation site 10 so that the narrow implant housings 20 and standard implant housings 22 are surrounded on all sides except for the side in contact with the dental dam 58 (as shown in FIG. 9). The practitioner will also ensure that the dental prosthesis 2 is properly aligned within the mouth of the subject at this time. The resin 62 may then begin to cure and harden due to a chemical reaction. As described further below and as shown in FIG. 9, the curing of the resin 62 causes the narrow implant housings 22 and standard implants housings 20 to be fixed to the dental prosthesis 2. Once the housings are fixed to the dental prosthesis 2, each narrow implant housing 22 is fixed to the dental prosthesis 2 in a location that corresponds with the position of each narrow implant 8 on the installation site 10, and each standard implant housing 20 is fixed to the dental prosthesis 2 in a location that corresponds with the position of standard implant 6 on the installation site 10.

FIG. 9 shows a cross sectional view of a dental prosthesis 2 with resin 62 inside of the channel 60 after it has been placed over a narrow implant housing 22 and a standard implant housing 20. A standard implant abutment 16 extends through a standard opening 64 in a dental dam 58, and a narrow implant abutment 18 extends through a narrow opening 66 in dental dam 58. The standard implant housing 20 contains a standard implant housing insert 52*f* which in turn is placed over the standard implant abutment 16. The narrow implant housing 22, contains a narrow implant insert 50*a*, which in turn is placed over the narrow implant abutment 18. The resin 62 surrounds the narrow implant housing 22 and standard implant housing 20 on all sides except for the side in contact with the dental dam 58. Below the dental dam 58 is tissue 68 that has been sutured together after the flap 12 has been closed. Bone graft material 70 has been placed within an empty tooth socket 72. After a relatively short period of time (e.g., about six minutes), the resin 62 cures and the narrow implant housing 22 and standard implant housing 20 becomes fixedly attached to the dental prosthesis 2.

Once curing is complete, the dental prosthesis 2 and any dental dam 58 that has been used are removed from the installation site 10. The dental prosthesis 2 may then be taken to a lab for a finishing process, where final trimming and smoothing of the resin 62 is performed, after which the dental prosthesis 2 is placed back on the installation site 10 and the embedded narrow implant housing 22 and standard implant housing 20 are seated on the narrow implant abutment 8 and standard implant abutment 6. The practitioner will then snap the dental prosthesis 2 into place by placing pressure on the dental prosthesis 2, it being understood that the direction the pressure is applied will depend on the orientation of the narrow implant 8 and standard implant 6 within the subject's mouth. The procedure is complete and the subject is permitted to leave the practitioner's office with a dental prosthesis 2 that is stable and ready to be used while the subject heals.

While the subject heals, a final prosthesis is fabricated that may include a reinforcement member made of any material commonly used in the art, including, without limitation, titanium, a cobalt/chrome alloy, a ceramic, and/or the like. The reinforcement member may be, for example a mesh framework, bars, and/or the like. In some embodiments, the reinforcement member may be covered by an exterior made of any material commonly used in the art, including, without limitation, acrylic resin, porcelain, a glass based compound, a glass like product such as zirconia, and/or the like. Once the subject heals and the final prosthesis is complete, the dental prosthesis 2 is removed and the final prosthesis is installed in its place.

Figure 10:
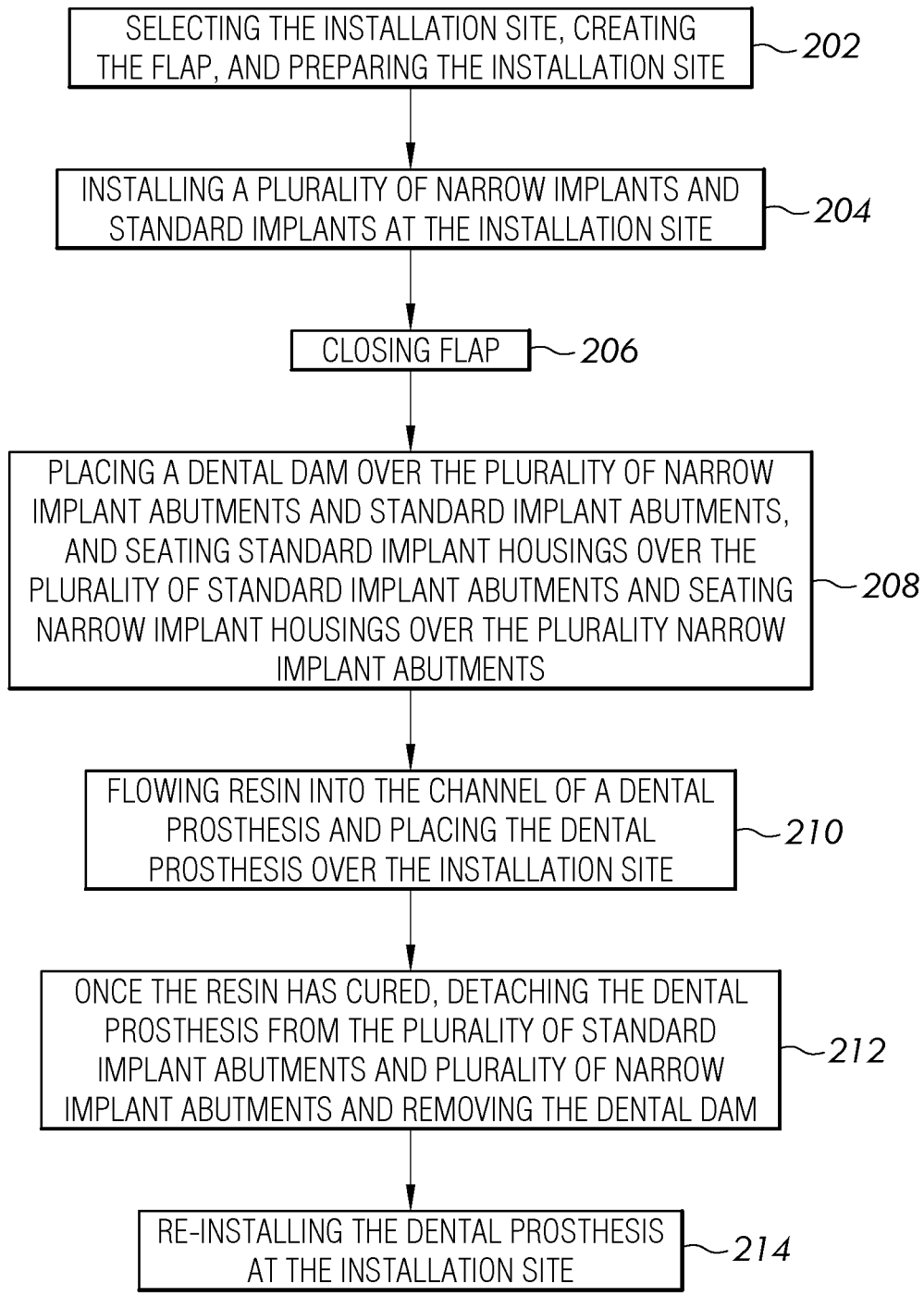
FIG. 10 depicts a flow chart setting forth one an illustrative method of applying a dental prosthesis according to one or more embodiments shown and described herein.

FIG. 10 is a high level block diagram illustrating a method for installing a dental prosthesis in the mouth of a subject according to an embodiment of the current invention. The method includes the following steps: selecting the installation site, creating the flap and preparing the installation site (step 202); installing a plurality of narrow implants and standard implants at the installation site (step 204); closing the flap (step 206); placing a dental dam over the plurality of narrow implant abutments and standard implant abutments and seating standard implant housings over the plurality of standard implant abutments and seating narrow implant housings over the plurality narrow implant abutments (step 208); flowing resin into the channel of a dental prosthesis and placing the dental prosthesis over the installation site (step 210); once the resin has cured, detaching the dental prosthesis from the plurality of standard implant abutments and plurality of narrow implant abutments and removing the dental dam (step 212); and re-installing the dental prosthesis at the installation site (step 214).

In this embodiment of the invention, step 202 includes the practitioner selecting an appropriate installation site on the subject's maxilla or mandible based on the subject's anatomy. In particular, the practitioner may install the plurality of narrow implants and standard implants in areas where there is an appropriate amount of bone to support each narrow implant and standard implant and in areas where the installation of each narrow implant and standard implant is less likely to damage to structures within subject's head, including without limitation nerves that are located within the subject's mouth and the subject's sinus cavities.

Step 202 further includes making incisions along the installation site and separating the subject's tissue from the bone using a periosteal elevator or similar tool. The creation of this incision and separation of the tissue from the bone creates a flap that will be closed after the plurality of narrow implants and standard implants have been installed. Once the tissue is separated from the bone, the practitioner will prepare the installation site by extracting any teeth within the installation site, and removing enough bone from the installation site so that there is an appropriate amount of inter-occlusal space to allow the dental prosthesis to be installed. Generally speaking, the appropriate amount of inter-occlusal space is at least 15 mm. The practitioner will also ensure the platform 57 (as shown in FIGS. 6 and 9) is generally level and flat.

Turning back to FIG. 10, Step 204 includes installing plurality of standard implants and plurality of narrow implants at the installation site. The plurality of standard implants and plurality of narrow implants may be installed wherever the practitioner determines there is suitable bone structure to support the narrow implants and standard implants. Suitable sites may include installing an implant within the tooth socket of an extracted tooth or within an edentulous area. In the maxilla of a subject, the plurality of standard implants and plurality of narrow implants would preferably be placed towards the palatal aspect of the edentulous area or tooth socket. In the mandible of a subject, the plurality of standard implants and plurality of narrow implants would preferably be placed in the lingual aspect of edentulous area or tooth socket. The practitioner's placement of the implants in the palatal or lingual aspect of the mandible or maxilla at the installation sight helps ensure that the plurality of standard implant housings and narrow implant housings can be orientated within the dental prosthesis in way that does not interfere with appearance of the facial edge of the dental prosthesis.

A practitioner may also utilize discretion to determine what type of implants to install in a particular location, as well as the amount of narrow implants or standard implants necessary to support the dental prosthesis. For instance, the practitioner may evaluate a subject's anatomy and install a standard implant in the area of the right lateral incisor and two narrow implants distal to that standard implant on the right side of the subject's arch. On the left side of the subject's arch, the practitioner may install a narrow implant in the area of the left lateral incisor, two more narrow implants distal to the narrow implant located in the area of the lateral incisor. In a different subject with different anatomy, the practitioner may utilize the same orientation as outlined above on the right side, but may install a narrow implant in the area of the left lateral incisor, a standard implant distal to that narrow implant, and two more narrow implants distal to that standard implant. This inherent flexibility in the method allows for a practitioner to install a dental prosthesis in a wider variety of subjects than existing methods for installing a FAFD dental prosthesis.

Step 206 in this embodiment includes closing the flap 12. Prior closing the flap the practitioner may insert bone graft material in any tooth socket where a tooth extraction has taken place. Then the practitioner will begin to close the flap using sutures. The practitioner closes the flap so that the plurality of narrow implant abutments and plurality of standard implant abutments extend though narrow openings in the flap, while the remainder of the flap is sutured to a close.

Step 208 in this embodiment includes placing a dental dam over the narrow implant abutments and standard implant abutment and seating standard implant housings on standard implant abutments and narrow implant housings on narrow implant abutments. In some instances, the dental dam may include a thin fabric without any slits or holes in it that is made of rubber, nylon or other material commonly used in the art. In such an instance, the practitioner will cut the standard openings for the standard implant abutments and narrow openings for the narrow implant abutments within the dental dam that correspond with the location of the plurality of narrow implant abutments and standard implant abutments. The standard openings and narrow openings should only be as large as necessary to allow the narrow implant abutments and standard implant abutments to extend through the dental dam. Then, the practitioner will place dental dam over the plurality of narrow implant abutments and standard implant abutments, and place the plurality of standard implant housings over the exposed plurality of standard implants and the plurality of narrow implant housings over the exposed narrow implant abutments.

Step 210 in this embodiment includes placing a resin within the channel of the dental prosthesis and placing the dental prosthesis into the subject's mouth such that the plurality of narrow implant housings and plurality of standard implant housings are surrounded by resin on all sides except for the side that is in contact with the dental dam. Prior to the time when the resin hardens, the practitioner may make minor adjustments to the dental prosthesis to ensure it is properly aligned within the mouth of the subject.

Step 212 in this embodiment involves removing the dental prosthesis from the installation site and removing the dental dam. This step 212 takes place after the resin has hardened and the plurality of narrow implant housings and standard implant housings are fixed to the dental prosthesis. The practitioner may then remove the dental prosthesis from the subject by disengaging the plurality of narrow implant housings and standard implant housings from the plurality of narrow implant abutments and standard implant abutments. After the dental prosthesis has been removed, the dental dam can be removed.

Step 214 in this embodiment involves re-installing the dental prosthesis at the installation site by snapping it into place.

Figure 11:
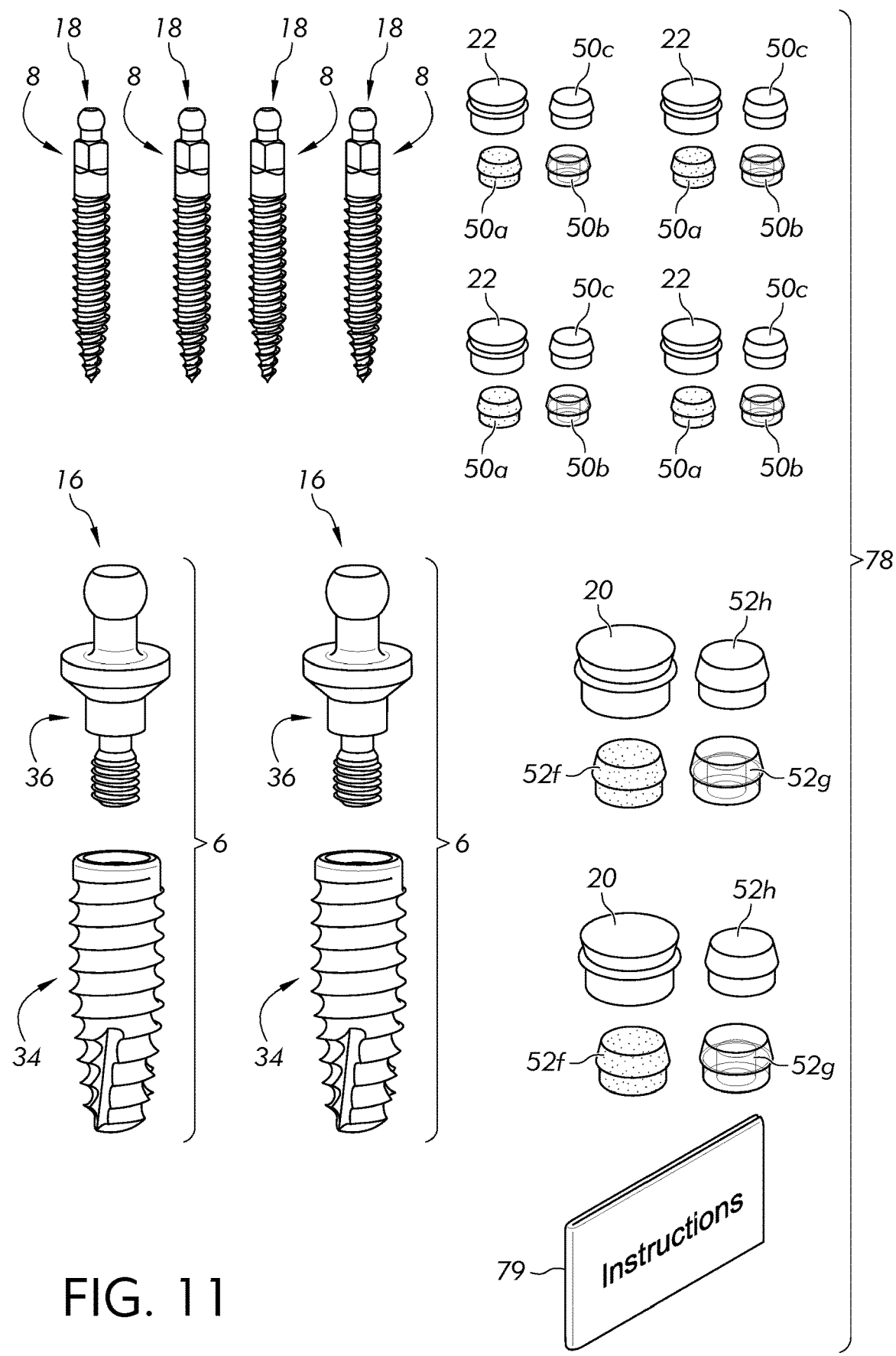
FIG. 11 depicts a perspective view of an illustrative kit of components for applying a dental prosthesis according to one or more embodiments shown and described herein.

FIG. 11 depicts a kit 78 according to one of the embodiments described herein. The kit 78 contains a plurality of narrow implants 8 and a plurality of standard implants 6. While the kit in FIG. 11 contains four narrow implants 8 and two standard implants 6, it should be understood that the plurality of standard implants 6 within the kit 78 may be a different number than two and the plurality of narrow implants 8 within the kit 78 may contain a different number than four.

Each narrow implant 8 in the kit 78 is a one-piece implant that includes a narrow implant abutment 18 that is a ball abutment. The standard implant 6 includes an upper component 36 and a lower component 34. The upper component 36 of the standard implant 6 includes a standard implant abutment 16 that is a ball abutment. The kit may optionally contain other narrow implants and standard implants with narrow implant abutments and standard implant abutments of various shapes common in the art. The kit also includes four narrow implant housings 22 and four sets of narrow implant housing inserts 50*a*, 50*b*, and 50*c* that correspond to the shape of the narrow implant abutment 18. Corresponding to the standard implants 6, the kit includes two standard implant housings 20 that correspond to the shape of the standard implant abutment 16, and two sets of standard implant housing inserts 52*f*, 52*g*, and 52*h*. The kit also includes a set of instructions 79 outlining the processes described in FIG. 10. The kit may also optionally include a dental dam 58 (not shown), a dental prosthesis 2 (not shown), and resin 62 (not shown).

It should now be understood that the methods, systems or kits disclosed herein relate to a treatment option for individuals that have lost all or a substantial portion of their teeth on an arch that is more stable and permanent than traditional dentures, and that may be utilized on subjects that lack the bone structure necessary to support a FAFD dental prosthesis or that have terminal dentition While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of installing a dental prosthesis, the method comprising:
   installing at least one narrow implant by fixing a bottom portion of the narrow implant into a bone in a subject's mouth and leaving a top portion of the narrow implant exposed, where the top portion comprises a narrow implant abutment;
   installing at least one standard implant comprising two separate components by fixing a first, lower component of the two separate components of the standard implant into the bone in the subject's mouth, leaving an interior cavity of the lower component exposed to interlock with a second, upper component of the two separate components, and interlocking a lower portion of the upper component within the interior cavity of the lower component to leave upper portion of the upper component of the standard implant exposed, where the upper portion of the upper component comprises a flanged abutment having an exterior wall defining a depression that extends circumferentially along the exterior wall, and where the upper component comprises a collar positioned between the lower portion of the upper component and the flanged abutment;
   placing a narrow implant housing over each narrow implant abutment;
   placing a standard implant housing over each flanged abutment;
   forming a channel of a dental prosthesis such that each narrow implant housing and each standard implant housing can be disposed in the channel of the dental prosthesis;
   flowing a resin within the channel;
   after placing the narrow implant housing over each narrow implant abutment and after placing the standard implant housing over each flanged abutment, placing the dental prosthesis over each narrow implant housing and each standard implant housing such that the resin surrounds each narrow implant housing and each standard implant housing within the channel; and
   curing the resin such that each narrow implant housing and each standard implant housing is fixed within the resin and the resin is fixed within the channel of the dental prosthesis.

2. The method of claim 1, wherein installing the at least one narrow implant comprises installing a plurality of narrow implants.

3. The method of claim 1, wherein installing the at least one standard implant comprises installing a plurality of standard implants.

4. The method of claim 1, wherein installing the at least one narrow implant and at least one standard implant comprises installing the at least one narrow implant and at least one standard implant in a maxillary bone of a subject.

5. The method of claim 1, wherein installing the at least one narrow implant and at least one standard implant comprises installing the at least one narrow implant and at least one standard implant in a mandibular bone of a subject.

6. The method of claim 1, further comprising:
   placing a narrow implant housing insert within a narrow housing cavity located within the narrow implant housing; and
   placing the narrow implant housing over the narrow implant abutment, thereby putting the narrow housing insert into contact with the narrow implant abutment.

7. The method of claim 1, further comprising:
   placing a standard implant housing insert within a standard housing cavity located within the standard implant housing; and
   placing the standard implant housing over the flanged abutment, thereby putting the standard implant housing insert into contact with the flanged abutment.

8. The method of claim 1, wherein the at least one narrow implant abutment is a ball abutment.

9. The method of claim 1, further comprising:
   placing a dental dam over each narrow implant and each standard implant, the dental dam comprising at least one narrow opening and at least one standard opening, such that each narrow opening allows each narrow implant abutment to extend through the dental dam once the dental dam is placed over each narrow implant, and such that each standard opening allows each flanged abutment to extend through the dental dam once the dental dam is placed over each flanged abutment.

10. The method of claim 9, further comprising removing each narrow implant housing from each narrow implant abutment and each standard implant housing from each flanged abutment, thereby removing the dental prosthesis;

removing the dental dam; and placing each narrow implant housing over each narrow implant abutment and each standard implant housing over each flanged abutment, thereby reinstalling the dental prosthesis.

11. A method of installing a dental prosthesis, comprising:

installing at least one narrow implant by fixing a bottom portion of the narrow implant into a bone in a subject's mouth and leaving a top portion of the narrow implant exposed, where the top portion comprises a narrow implant abutment;

installing at least one standard implant comprising two separate components by fixing a first, lower component of the two separate components of the standard implant into the bone in the subject's mouth, leaving an interior cavity of the lower component exposed to interlock with a second, upper component of the two separate components, and interlocking a lower portion of the upper component within the interior cavity of the lower component to leave an upper portion of the upper component of the standard implant exposed, where the upper portion of the upper component comprises a flanged abutment having an exterior wall defining a depression that extends circumferentially along the exterior wall, and where the upper component comprises a collar positioned between the lower portion of the upper component and the flanged abutment;

placing a dental dam over each at least one narrow implant and each at least one standard implant, the dental dam comprising at least one narrow opening and at least one standard opening, such that each narrow opening allows each narrow implant abutment to extend through the dental dam once the dental dam is placed over each narrow implant, and such that each standard opening allows each flanged abutment to extend through the dental dam once the dental dam is placed over each flanged abutment;

placing a narrow implant housing insert within a narrow housing cavity located within an at least one narrow implant housing;

placing each narrow implant housing over each narrow implant abutment, thereby putting each narrow housing insert into contact with each narrow implant abutment;

placing a standard implant housing insert within a standard housing cavity located within an at least one standard implant housing;

placing each standard implant housing over each flanged abutment, thereby putting each standard implant housing insert into contact with each flanged abutment;

forming a channel of a dental prosthesis such that each narrow implant housing and each standard implant housing can be disposed in the channel of the dental prosthesis;

flowing a resin within the channel;

after placing each narrow implant housing over each narrow implant abutment and after placing each standard implant housing over each flanged abutment, placing the dental prosthesis over each narrow implant housing and each standard implant housing such that the resin surrounds each narrow implant housing and each standard implant housing within the channel;

curing the resin such that each narrow implant housing and each standard implant housing is fixed within the resin and the resin is fixed within the channel of the dental prosthesis;

removing each narrow implant housing from each narrow implant abutment and each standard implant housing from each flanged abutment, thereby removing the dental prosthesis;

removing the dental dam; and placing each narrow implant housing over each narrow implant abutment and each standard implant housing over each flanged abutment, thereby reinstalling the dental prosthesis.

12. The method of claim 11 wherein installing the at least one narrow implant comprises installing a plurality of narrow implants and installing the at least one standard implant comprises installing a plurality of standard implants.

13. The method of claim 1, wherein the collar is wider than the exterior wall.

14. The method of claim 11, wherein the collar is wider than the exterior wall.

* * * * *